(12) United States Patent
Kizhakkepat et al.

(10) Patent No.: US 11,554,864 B2
(45) Date of Patent: Jan. 17, 2023

(54) TECHNIQUES FOR INCREASING HEAT DISSIPATION IN LEAD-LAG DAMPERS

(71) Applicant: Bell Textron Inc., Fort Worth, TX (US)

(72) Inventors: Amarjit Olenchery Kizhakkepat, Fort Worth, TX (US); Andrew Paul Haldeman, Fort Worth, TX (US); Gary Miller, North Richland Hills, TX (US); Diana Tinlin, Fort Worth, TX (US)

(73) Assignee: TEXTRON INNOATIONS INC., Providence, RI (US)

( * ) Notice: Subject to any disclaimer, the term of this patent is extended or adjusted under 35 U.S.C. 154(b) by 396 days.

(21) Appl. No.: 16/832,173

(22) Filed: Mar. 27, 2020

(65) Prior Publication Data
US 2021/0300533 A1    Sep. 30, 2021

(51) Int. Cl.
| | | |
|---|---|---|
| *B64C 27/51* | (2006.01) | |
| *B64C 27/00* | (2006.01) | |
| *F16F 13/10* | (2006.01) | |
| *F16F 15/124* | (2006.01) | |
| *F16F 15/16* | (2006.01) | |
| *B64C 27/54* | (2006.01) | |

(52) U.S. Cl.
CPC .......... *B64C 27/51* (2013.01); *B64C 27/001* (2013.01); *B64C 27/54* (2013.01); *F16F 13/10* (2013.01); *F16F 15/124* (2013.01); *F16F 15/161* (2013.01); *F16F 2224/025* (2013.01); *F16F 2232/02* (2013.01)

(58) Field of Classification Search
CPC ... B64C 27/51; F16F 1/379; F16F 9/42; F16F 13/06; F16F 13/08
See application file for complete search history.

(56) References Cited

U.S. PATENT DOCUMENTS

| | | | |
|---|---|---|---|
| 4,105,365 A | 8/1978 | Ferris et al. | |
| 4,178,130 A | 12/1979 | Ferris et al. | |
| 8,764,396 B2 | 7/2014 | Stamps et al. | |
| 10,112,709 B2 | 10/2018 | Heverly et al. | |
| 2012/0222927 A1* | 9/2012 | Marking | B60G 17/08 188/274 |
| 2015/0176658 A1* | 6/2015 | Stamps | F16F 13/08 267/113 |

OTHER PUBLICATIONS

UTV Inc, Amazon.com product Polaris RZR XP 900 Walker Evans Rear Passenger Shock Heat Shield. Date first available Jul. 25, 2019. https://www.amazon.com/dp/B07VQWZBSZ/ref=cm_sw_r_cp_api_i_XDHZE542MA6H4SEE9NWZ?pldnSite=1 (Year: 2019).*

* cited by examiner

*Primary Examiner* — Timothy D Collins
*Assistant Examiner* — Brendan Kroger Schneider
(74) *Attorney, Agent, or Firm* — Akona IP PC

(57) ABSTRACT

One embodiment described herein is a damper for a rotor system, the damper comprising a cylindrical housing having a hollow interior; a piston disposed within the hollow interior and extending along a central axis of the housing; a first attachment member disposed on a first end of the damper and connected to the housing; a second attachment member disposed on a second end of the damper and connected to the piston; and a conductive cover wrapped around a portion of an exterior surface of the housing between the first attachment member and the second attachment member.

17 Claims, 6 Drawing Sheets

US 11,554,864 B2

TECHNIQUES FOR INCREASING HEAT DISSIPATION IN LEAD-LAG DAMPERS

TECHNICAL FIELD

This disclosure relates generally to aircraft and, more particularly, to techniques for increasing the ability of lead/lag dampers used in such aircraft to dissipate heat.

BACKGROUND

Fluid motion within a fluid-elastic or hydraulic damper for implementing a lead/lag damper in a rotorcraft rotor hub, generates a significant amount of heat that must be dissipated quickly so as to not adversely affect damper performance. In a rotor hub that is not completely covered by a rotor hub fairing, airflow over the dampers will keep them sufficiently cool. Conversely, in a rotor hub that is completely covered by a rotor hub fairing, there is insufficient airflow to adequately cool the dampers, which will impede the performance of the dampers and create a potentially dangerous situation.

SUMMARY

One embodiment is a damper for a rotor system, the damper comprising a cylindrical housing having a hollow interior; a piston disposed within the hollow interior and extending along a central axis of the housing; a first attachment member disposed on a first end of the damper and connected to the housing; a second attachment member disposed on a second end of the damper and connected to the piston; and a conductive cover wrapped around a portion of an exterior surface of the housing between the first attachment member and the second attachment member.

Another embodiment is a rotor system comprising a rotor hub comprising a plurality of extension arms for connecting rotor blades to the rotor hub and plurality of dampers connected between a respective one of the extension arms and the rotor hub. Each of the dampers comprises a cylindrical housing having a hollow interior; a piston disposed within the hollow interior and extending along a central axis of the housing; a first attachment member disposed on a first end of the damper and connected to the housing; a second attachment member disposed on a second end of the damper and connected to the piston; and a conductive cover wrapped around a portion of an exterior surface of the housing between the first attachment member and the second attachment member.

Yet another embodiment is a rotorcraft comprising a fuselage; and a rotor system associated with the fuselage. The rotor system comprises a rotor hub comprising a plurality of extension arms for connecting rotor blades to the rotor hub and a plurality of dampers connected between a respective one of the extension arms and the rotor hub. Each of the dampers comprises a cylindrical housing having a hollow interior; a piston disposed within the hollow interior and extending along a central axis of the housing; a first attachment member disposed on a first end of the damper and connected to the housing; a second attachment member disposed on a second end of the damper and connected to the piston; and a conductive cover wrapped around a portion of an exterior surface of the housing between the first attachment member and the second attachment member.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
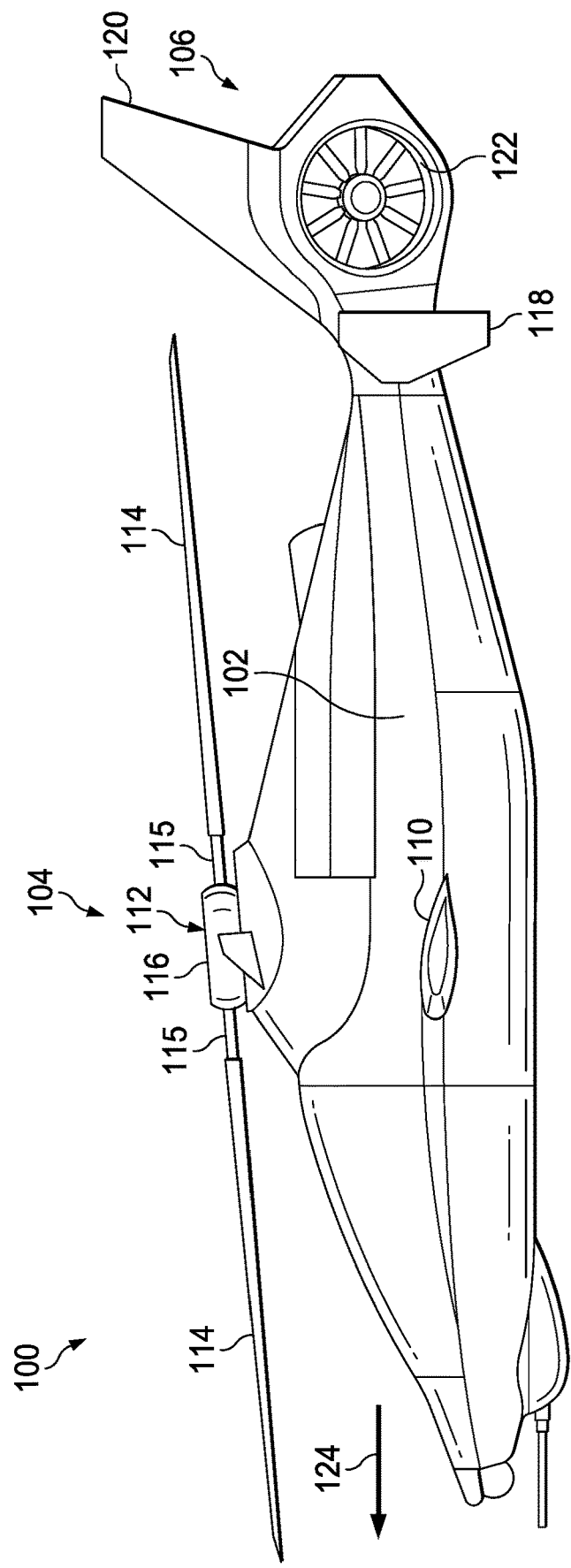
FIG. 1 illustrates a side view of an example aircraft having a rotor system employing techniques for increasing the ability of lead/lag dampers thereof to dissipate heat in accordance with certain embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of-an aircraft relative to another component or component aspect(s). The term "inboard" may refer to a location of a component that is within the fuselage of an aircraft and/or a spatial direction that is closer to a center of rotation or along a centerline of the aircraft relative to another component or component aspect(s), wherein the centerline runs in a between the front and the rear of the aircraft. The term "outboard" may refer to a location of a component that is outside the fuselage-of an aircraft and/or a spatial direction that farther from the center of rotation or the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 2:
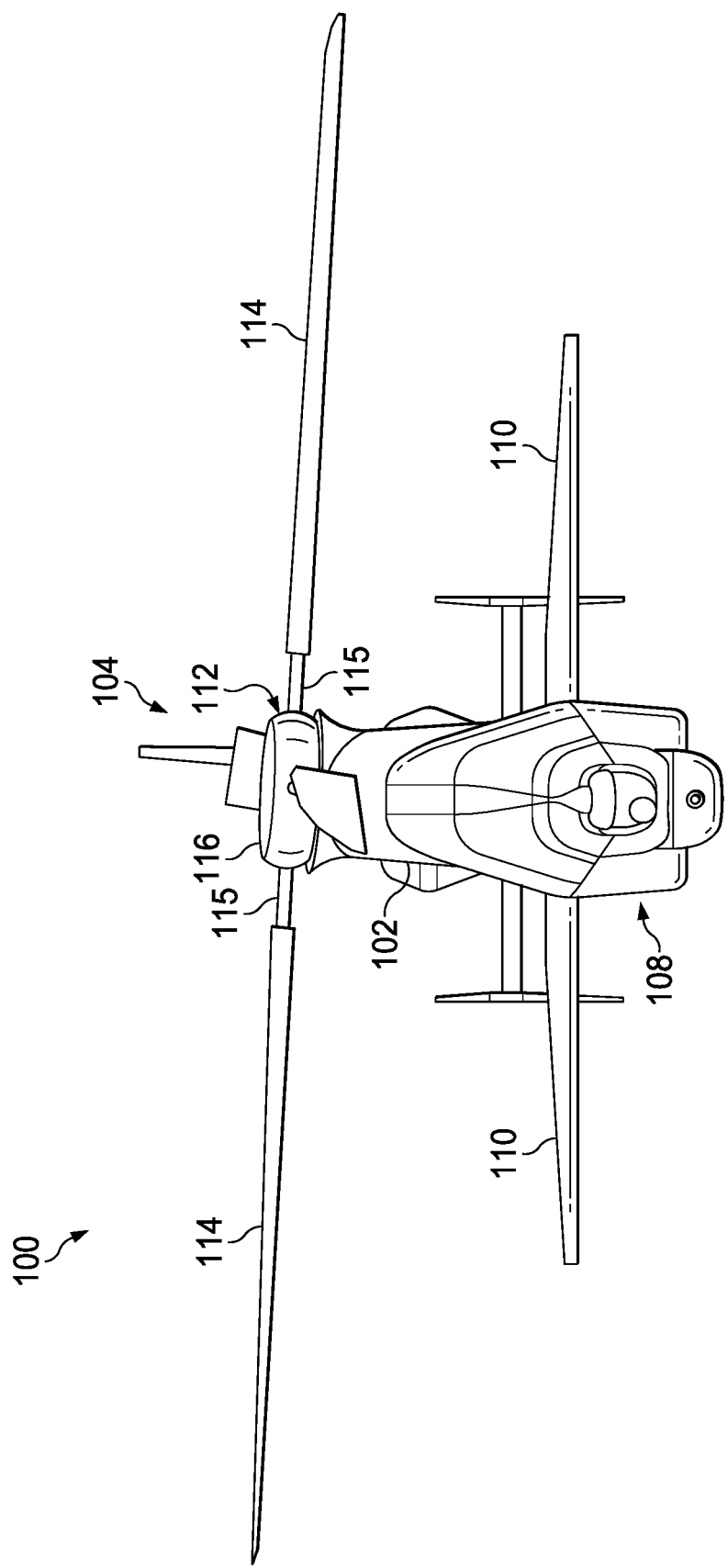
FIG. 2 illustrates a front plan view of the aircraft of FIG. 1.

Referring to FIGS. 1 and 2, illustrated therein are different views (i.e., a side view and a front view, respectively) of an example embodiment of an aircraft, which in the illustrated example is a rotorcraft 100. As shown in FIGS. 1 and 2, rotorcraft 100, which includes a fuselage 102, a primary rotor system 104, and an empennage 106. The fuselage 102 is the main body of the rotorcraft 100, which may include a cabin (e.g., for crew, passengers, and/or cargo) and/or may house certain mechanical components, electrical components, etc. (e.g., engine(s), transmission, flight controls, etc.).

The rotor system 104 is used to generate lift for rotorcraft 100. For example, the rotor system 104 (also generally referred to as the "rotor") may include a rotor hub 112 (also referred to as a "rotor hub assembly" or more generally as a "hub") coupled to a plurality of rotor blades 114 (also referred to generally as "blades") via blade extensions 115. Torque generated by the engine(s) of the rotorcraft causes the rotor blades 114 to rotate, which generates lift. In accordance with features of embodiments disclosed herein, and as described in greater detail below, the rotor hub 112 is completely shrouded by a rotor hub fairing 116.

The empennage 106 of the rotorcraft 100 includes a horizontal stabilizer 118, a vertical stabilizer 120, and a tail rotor or anti-torque system 122. Although not shown in the view illustrated in FIG. 1, a corresponding horizontal stabilizer is disposed on the other side of the rotorcraft 100 opposite the horizontal stabilizer 118. The horizontal stabilizer 118 and vertical stabilizer 120 respectively provide horizontal and vertical stability for the rotorcraft 100. Moreover, tail rotor or anti-torque system 122 may be used to provide anti-torque and/or direction control for the rotorcraft 100.

Rotorcraft 100 relies on rotor system 104 for flight capabilities, such as controlling (e.g., managing and/or adjusting) flight direction, thrust, and lift of the rotorcraft. For example, the pitch of each rotor blade 114 can be controlled using collective control or cyclic control to selectively control direction, thrust, and lift of the rotorcraft 100. During collective control, all of the rotor blades 114 are collectively pitched together (e.g., the pitch angle is the same for all blades), which affects overall thrust and lift. During cyclic control, the pitch angle of each of the rotor blades 114 varies depending on where each blade is within a cycle of rotation (e.g., at some points in the rotation the pitch angle is not the same for all blades), which can affect direction of travel of the rotorcraft 100.

Aircraft such as rotorcraft 100 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades", "yoke/blades", "hub/yoke/blades", and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the rotor blades flap. For example, for rotorcraft 100, the most aft blade (e.g., nearest to tail rotor or anti-torque system 122) of the rotor system 104 may be pitched more nose-up and the most forward blade may be pitched more nose-down; to provide a forward direction of travel (as generally indicated by arrow 124) for rotorcraft 100.

Lead-lag, or leading and lagging, refers to the movement of rotor blades (such as rotor blades 114) forward and backward along a vertical hinge. Lead-lag is a capability designed into a fully articulate rotor system, such as rotor system 104, to reduce stress on the system caused by blade flapping. The need for lead-lag capability is a result of the Coriolis effect, or the law of conservation of angular momentum. In particular, as a blade flaps up, the speed of the blade increases due to the movement of the center of mass of the blade toward the axis of rotation. In contrast, as the blade flaps down, the speed of the blade decreases due to the movement of the center of mass of the blade away from the axis of rotation. Fluid-elastic or hydraulic lead-lag dampers allow the forces to equalize, thereby removing undue stress on the system.

Figure 3:
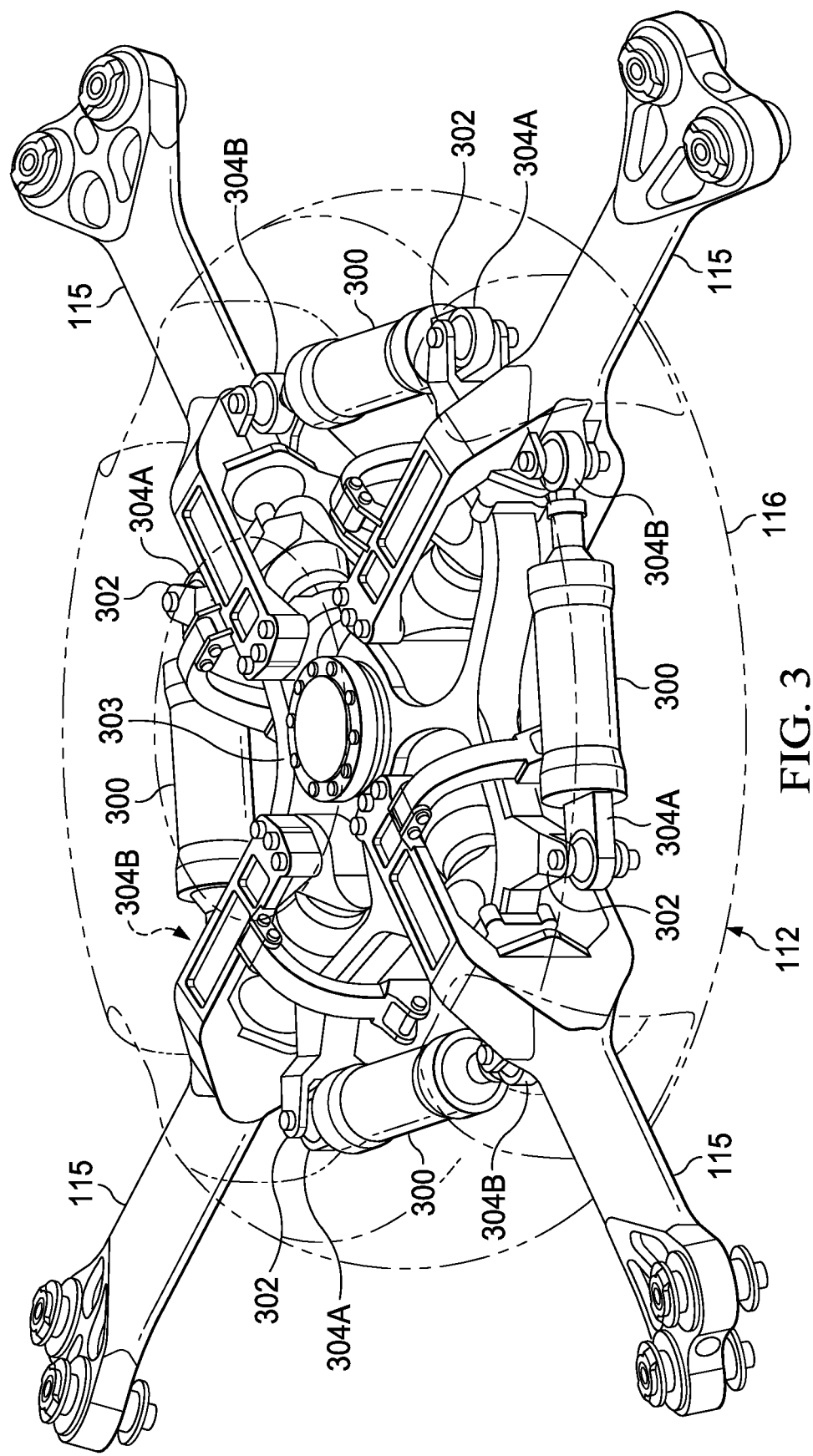
FIG. 3 illustrates the rotor hub of the aircraft of FIG. 1 in greater detail.

Referring now to FIG. 3, illustrated herein is a more detailed view of the rotor hub 112 shrouded by hub fairing 116. As shown in FIG. 3, lead-lag dampers 300 are provided. One end of each of the lead-lag dampers 300 is connected to an extension 302 of a yoke 303 of the rotor hub 112 via a first attachment member 304A, while the other end of each of the lead-lag dampers 300 is connected to a rotor blade extension arm 115 via a second attachment member 304B. As will be described in greater detail below, first attachment member 304A is rigidly coupled to a housing of the respective lead-lag damper 300, while second attachment member 304B is rigidly coupled to a piston of the respective lead-lag damper.

Although in the illustrated embodiment, first attachment members 304A and second attachment members 304B are coupled to yoke extensions 302 and rotor blade extension arms 115, respectively, it should be appreciated that the lead-lag dampers 300 may be associated with the rotor hub 112 in a variety of configurations. Moreover, lead-lag dampers 300 may be coupled between adjacent rotor blades (e.g., rotor blade extension arms 115) instead of being coupled between the yoke (e.g., yoke extensions 302) and rotor blades (e.g., rotor blade extension arms 115).

As previously noted, fluid-elastic or hydraulic lead-lag dampers used on fully articulated rotor hubs require cooling. This is typically accomplished via convection with the free stream air flow; however, such convective cooling is not possible when the dampers are contained within the hub fairing, as in the aircraft illustrated in FIGS. 1 and 2. Alternatively, damper cooling may be provided by cooling fins made out of aluminum or a material identical to that of the damper housing, such fins also add significant weight to the dampers and can cause kinematic clearance issues with respect to the pitch horn and pitch links of the rotor hub.

In accordance with features of embodiments described herein, a conductive cover (implemented using a graphite polymer or graphene sheet or film) is used to diffuse heat throughout exposed areas of the damper housing to facilitate and speed heat dissipation. One such sheet is a Pyrolytic Graphite Sheet (PGS)® sheet available from Panasonic Corporation, which may be used on bare or painted metal surfaces and cutouts in the sheets may be made to attach damper instrumentation and thermocouples to the damper. Graphene or PGS sheets further have a thermal conductivity of approximately 700 W/mK for a 100 μm sheet and a thermal conductivity of approximately 1950 W/mK for a 10 μm sheet. In other words, a 10 μm PGS has nearly five times the thermal conductivity of copper (~413 W/mK) and over eight times the thermal conductivity of aluminum (~237 W/mK).

Figure 4A:
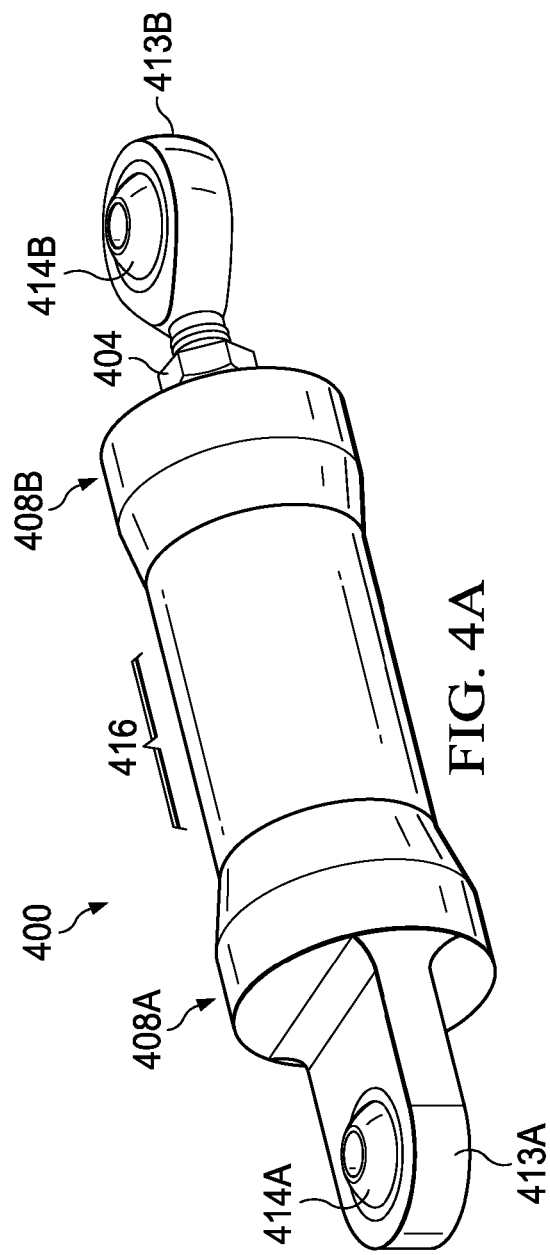
FIG. 4A is a perspective view of a lead-lag damper for use in a rotor system.
Figure 4B:
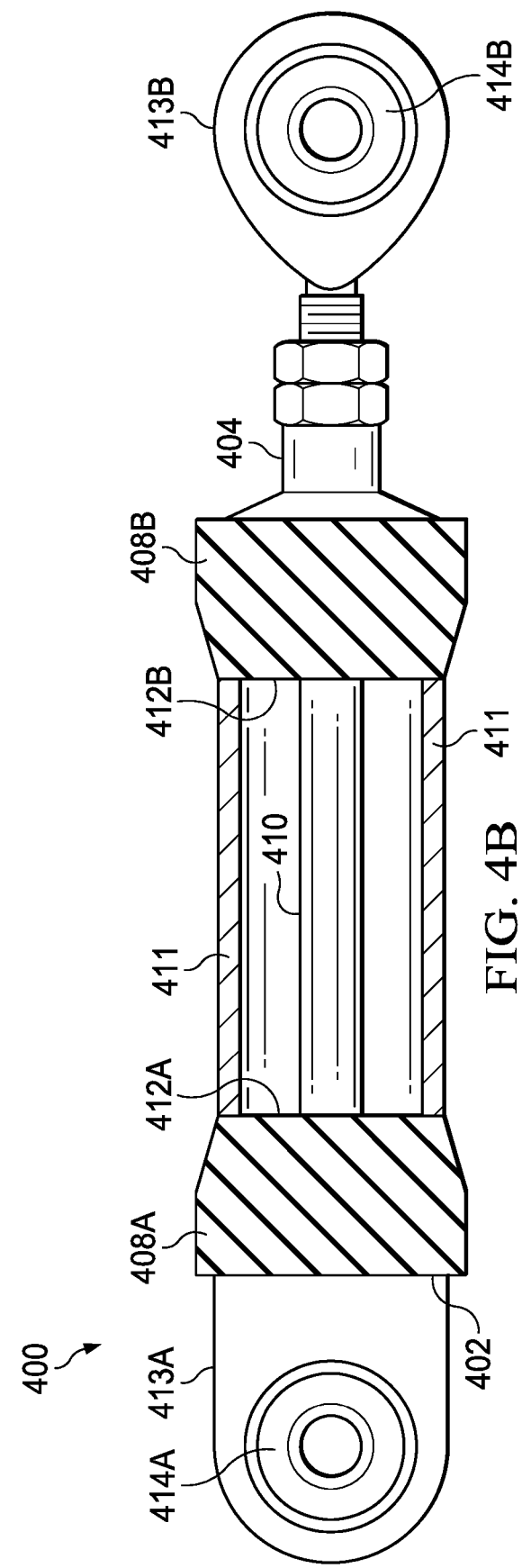
FIG. 4B is a section view of the lead-lag damper of FIG. 4A.

FIGS. 4A and 4B illustrate a lead-lag damper 400, such as the dampers 300. In particular, FIG. 4A is a perspective view of the lead-lag damper 400 and FIG. 4B is a section view of the lead-lag damper 400. As shown in FIGS. 4A and 4B, lead-lag damper 400 includes a housing 402, which may include a hollow interior in which operative components of the lead-lag damper 400 reside. Piston 404 extends along a central axis within the hollow interior of housing 402. As best shown in FIG. 4B, piston 404 is resiliently coupled to an interior of housing 402 via a first elastomeric member 408A and a second elastomeric member 408B. First elastomeric member 408A and second elastomeric member 408B each include elastomeric material that has an implementation spring rate and a damping rate. It may have a wide variety of configurations to tailor stiffness and damping properties of damper 400. In one example embodiment, elastomeric members 408A, 408B, are each solid elastomeric members. In another example embodiment, elastomeric members 408A, 408B, are each laminates of elastomeric layers with cylindrically shaped shims located therebetween. Further, the requisite length of the elastomeric members 408A, 408B, are implementation specific and depend in part on the predicted rotor hub dynamics and loading. Further, elastomeric members 408A, 408B, may provide only part of the total spring rate of damper 400, which may include other members for providing portions of the overall spring rate.

Piston 404 has an elongated portion 410 that extends between and interconnects the elastomeric members 408A, 408B. A sleeve 411 may be provided adjacent to the interior of the housing 402. Alternatively, the sleeve 411 may be integral with the interior of the housing 402. A sealed fluid housing may be formed by sleeve 411, interior surfaces 412A, 412B, of elastomeric members 408A, 408B, and piston 404. The fluid housing may be filled with a viscous fluid having implementation-specific viscosity characteristics to provide the desired damping. It should be appreciated that a fluid accumulator, volume compensator, or the like, may be plumb to the fluid housing in order to maintain the desired pressure of fluid within the fluid housing.

Damper 400 further includes a first attachment member 413A rigidly coupled to housing 402 for coupling a first end of the damper to a yoke extension and a second attachment member 413B rigidly coupled to piston 404 for coupling the second end of the damper to a blade extension arm. In the example embodiment, first attachment member 413A and second attachment member 413B are rod ends each having an integral spherical bearing 414A, 414B, respectively; however, it should be appreciated that the first and second attachment members 413A, 413B, may be of any configuration capable of providing a structural connection between rotor yoke extension and blade extension arm.

As best shown in FIG. 4A, fluid motion within the damper 400 generates heat within a region of the damper designated by a reference numeral 416.

Figure 5:
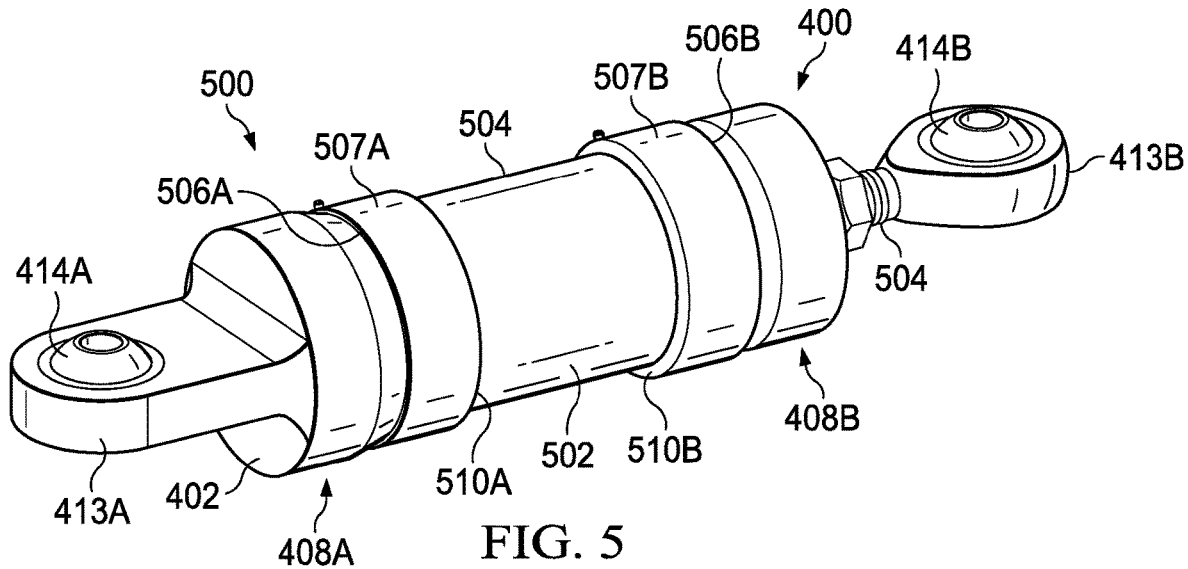
FIGS. 5-6 are perspective views of opposite sides of a lead-lag damper assembly for implementing techniques for increasing heat dissipation thereof in accordance with certain embodiments of the present disclosure.
Figure 6:
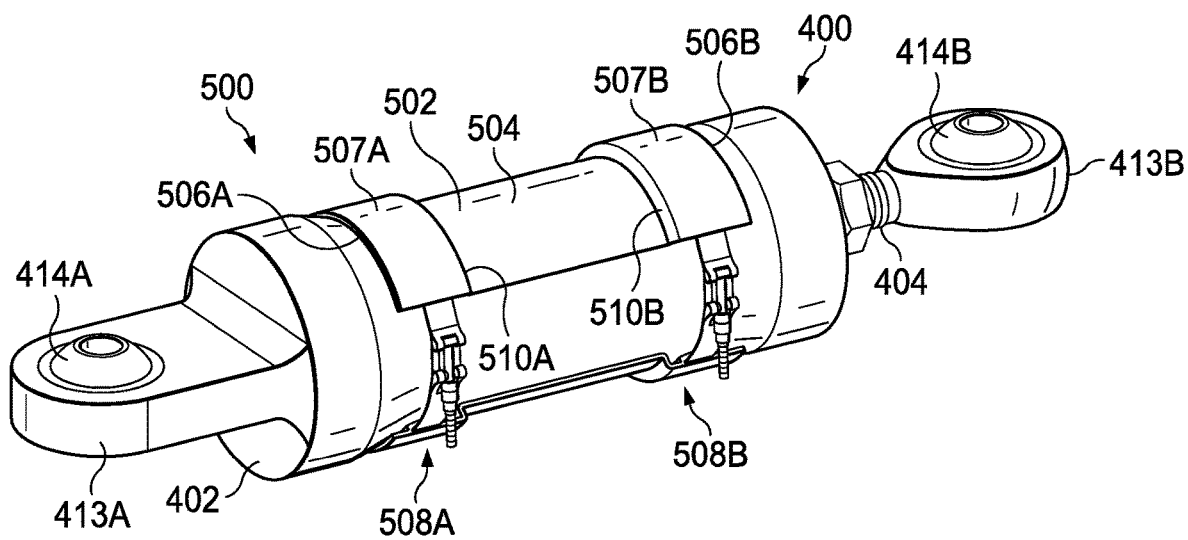

Referring now to FIGS. 5 and 6, illustrated therein are perspective views of opposite sides of a damper assembly 500 in accordance with embodiments described herein for implementing techniques for increasing heat dissipation thereof. As shown in FIGS. 5 and 6, the assembly 500 includes a conductive cover 502 wrapped around a portion of the housing 402 of damper 400. In certain embodiments, conductive cover 502 comprises an ultra-thin, lightweight, graphite polymer (or graphene) film with a high thermal conductivity that can withstand temperatures of up to 400 degrees Celsius.

Conductive cover 502 is disposed around the housing 402 such that a central portion 504 of the cover 502 is in direct contact with an exterior surface of the housing 402, thereby enabling the cover 502 to conduct heat generated in the heat generating region 416 of the damper 400 toward outside edges 506A, 506B, of the cover. As best shown in FIG. 6, in accordance with features of embodiments described herein, end portions 507A, 507B, of the cover 502 are elevated above and connected to the exterior surface of the housing 402 via connection mechanisms (or "spacers") 508A, 508B, disposed proximate outside edges 506A, 506B of the cover. End portions 507A, 507B, are delineated from center portion 504 via lips 510A, 510B.

Figure 7:
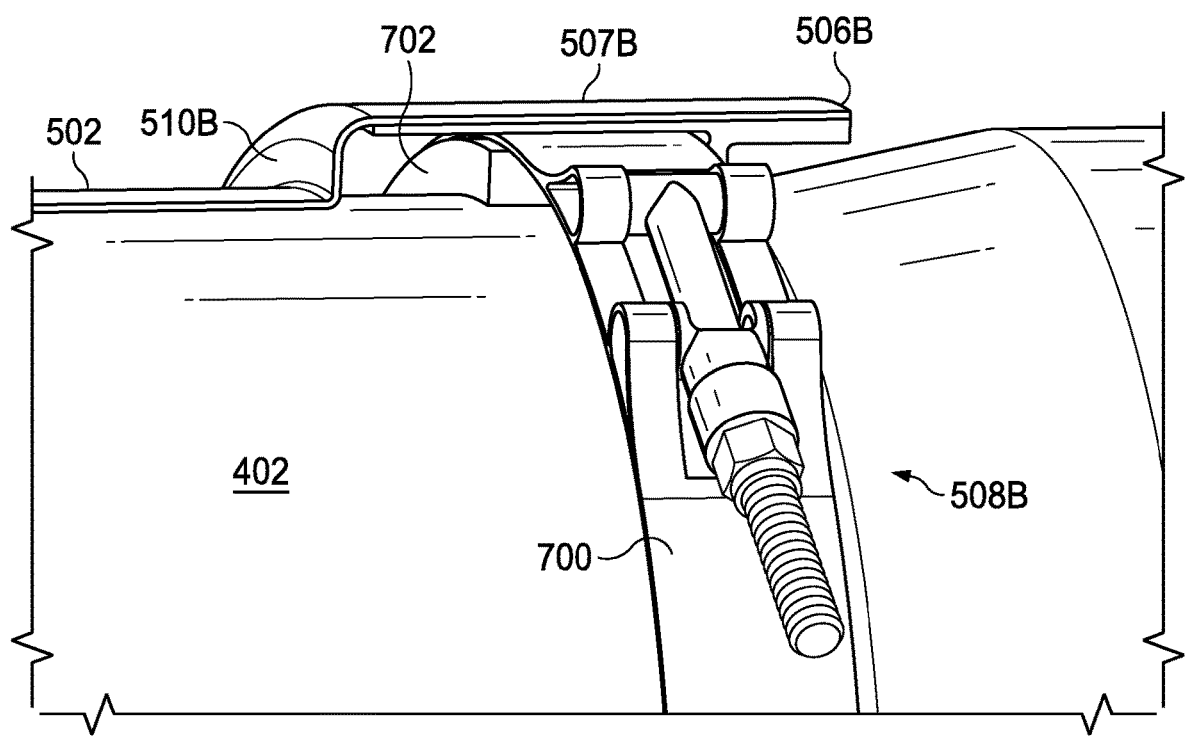
FIG. 7 is a more detailed view of a connection mechanism of the lead-lag damper assembly for implementing techniques for increasing heat dissipation thereof in accordance with certain embodiments of the present disclosure.

Referring now to FIG. 7, illustrated therein is a closeup view of connection mechanism 508B. As shown in FIG. 7, connection mechanism 508B includes a hose clamp 700 that attaches an insulating bracket 702 to the housing 402. In accordance with features of embodiments described herein, the insulating bracket 702 made from a suitable material like plastic, ceramic, nylon, etc., is used for elevating end portion 507B of the cover 502 over the exterior surface of the housing 402 and for insulating a portion of the elastomeric member 408B disposed interior to the housing 402 directly underneath the end portion 507B from the heat conducted to the outside edge 506B of the cover 502 from the heat generating region 416. The cover 502 and end portions 507B may be bonded on to the housing 402 and insulating bracket 702 using a suitable thermally conductive adhesive. Heat generated within the region 416 is dissipated away from the thermally sensitive elastomeric portions of the lead-lag damper thereby increasing damper life. In particular, referring also to FIGS. 4B and 6 inter alia, in accordance with features of embodiments described herein, lip portions 510A, 510B of respective end portions 507A, 507B, are positioned just inside surfaces 412A, 412B of elastomeric members 408A, 408B.

Example 1 is a damper for a rotor system, the damper comprising a cylindrical housing having a hollow interior; a piston disposed within the hollow interior and extending along a central axis of the housing; a first attachment member disposed on a first end of the damper and connected to the housing; a second attachment member disposed on a second end of the damper and connected to the piston; and a conductive cover wrapped around a portion of an exterior surface of the housing between the first attachment member and the second attachment member.

In Example 2, the damper of Example 1 further includes the piston being resiliently coupled to the interior of the housing via a first elastomeric member and a second elastomeric member.

In Example 3, the damper of any of Examples 1 and 2 further includes a first spacer member interposed between a first end of the conductive cover and the housing and a second spacer member interposed between a second end of the conductive cover and the housing, the first and second spacer members comprising non-conductive member.

In Example 4, the damper of any of Examples 1-3 further includes the first and second spacer members each including a hose clamp for attaching an insulating bracket to the housing.

In Example 5, the damper of any of Examples 1-4 further includes a portion of the conductive cover between the first and second spacer members being affixed to the housing with an adhesive.

In Example 6, the damper of any of Examples 1-5 further includes the first and second spacer members being respectively positioned on the housing such that the first and second spacer members function to insulate the first and second elastomeric members from heat conducted by the conductive cover.

In Example 7, the damper of any of Examples 1-6 further includes the damper comprising a lead lag damper.

In Example 8, the damper of any of Examples 1-7 further includes the damper comprising an elastomeric damper.

In Example 9, the damper of any of Examples 1-8 further includes the conductive cover comprising at least one of a graphite polymer or graphene.

Example 10 is a rotor system comprising a rotor hub including a plurality of extension arms for connecting rotor blades to the rotor hub; and a plurality of dampers connected between a respective one of the extension arms and the rotor hub, wherein each of the dampers includes a cylindrical housing having a hollow interior; a piston disposed within the hollow interior and extending along a central axis of the housing; a first attachment member disposed on a first end of the damper and connected to the housing; a second attachment member disposed on a second end of the damper and connected to the piston; and conductive cover wrapped around a portion of an exterior surface of the housing between the first attachment member and the second attachment member.

In Example 11, the rotor system of Example 10 further includes, for each of the dampers, the piston being resiliently coupled to the interior of the housing via a first elastomeric member and a second elastomeric member.

In Example 12, the rotor system of any of Examples 10 and 11 further comprises each of the dampers further including a first spacer member interposed between a first end of the conductive cover and the housing and a second spacer member interposed between a second end of the conductive cover and the housing, the first and second spacer members comprising non-conductive material.

In Example 13, the rotor system of any of Examples 10-12 further includes each of the first and second spacer members including a hose clamp for attaching an insulating bracket to the housing.

In Example 14, the rotor system of any of Examples 10-13 further includes, for each of the dampers, each of the first and second spacer members being respectively positioned on the housing such that the first and second spacer members function to insulate the first and second elastomeric members from heat conducted by the conductive cover.

In Example 15, the rotor system of any of Examples 10-14 further includes each of the dampers including a lead lag damper.

In Example 16, the rotor system of any of Examples 10-15 further includes, for each of the dampers, the first attachment member being connected to a rotor yoke extension of the rotor hub and the second attachment member being connected to one of the extension arms.

Example 17 is a rotorcraft including a fuselage and a rotor system associated with the fuselage, the rotor system including a rotor hub comprising a plurality of extension arms for connecting rotor blades to the rotor hub; a plurality of dampers connected between a respective one of the extension arms and the rotor hub, wherein each of the dampers comprises a cylindrical housing having a hollow interior; a piston disposed within the hollow interior and extending along a central axis of the housing; a first attachment member disposed on a first end of the damper and connected to the housing; a second attachment member disposed on a second end of the damper and connected to the piston; and a conductive cover wrapped around a portion of an exterior surface of the housing between the first attachment member and the second attachment member.

In Example 18, the rotorcraft of Example 17 may further include, for each of the dampers, the piston being resiliently coupled to the interior of the housing via a first elastomeric member and a second elastomeric member.

In Example 19, the rotorcraft of any of Examples 17-18 may further include each of the dampers further including a first spacer member interposed between a first end of the conductive cover and the housing and a second spacer member interposed between a second end of the conductive cover and the housing, the first and second spacer members comprising non-conductive material.

In Example 20, the rotorcraft of any of Examples 17-19 may further include, for each of the dampers, each of the first and second spacer members being respectively positioned on the housing such that the first and second spacer members function to insulate the first and second elastomeric members from heat conducted by the conductive cover.

The diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The embodiments described throughout this disclosure provide numerous technical advantages, including by way of example, maintaining performance at high angles of attack while increasing performance at low angles of attack.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A damper for a rotor system, the damper comprising:
a cylindrical housing having a hollow interior;
a piston disposed within the hollow interior and extending along a central axis of the housing;
a first attachment member disposed on a first end of the damper and connected to the housing;
a second attachment member disposed on a second end of the damper and connected to the piston;
a conductive cover wrapped around a portion of an exterior surface of the housing between the first attachment member and the second attachment member; and
a first spacer member interposed between a first end of the conductive cover and the housing and a second spacer member interposed between a second end of the conductive cover and the housing, the first and second spacer members comprising non-conductive material.

2. The damper of claim 1, wherein piston is resiliently coupled to the interior of the housing via a first elastomeric member and a second elastomeric member.

3. The damper of claim 1, wherein the first and second spacer members each comprise a hose clamp for attaching an insulating bracket to the housing.

4. The damper of claim 1, wherein a portion of the conductive cover between the first and second spacer members is affixed to the housing with an adhesive.

5. The damper of claim 1, wherein the first and second spacer members are respectively positioned on the housing such that the first and second spacer members function to insulate the first and second elastomeric members from heat conducted by the conductive cover.

6. The damper of claim 1, wherein the damper comprises a lead lag damper.

7. The damper of claim 1, wherein the damper comprises an elastomeric damper.

8. The damper of claim 1, wherein the conductive cover comprises at least one of a graphite polymer or graphene.

9. A rotor system comprising:
a rotor hub comprising a plurality of extension arms for connecting rotor blades to the rotor hub; and
a plurality of dampers connected between a respective one of the extension arms and the rotor hub, wherein each of the dampers comprises:
a cylindrical housing having a hollow interior;
a piston disposed within the hollow interior and extending along a central axis of the housing;
a first attachment member disposed on a first end of the damper and connected to the housing;
a second attachment member disposed on a second end of the damper and connected to the piston; and
a conductive cover wrapped around a portion of an exterior surface of the housing between the first attachment member and the second attachment member;
wherein each of the dampers further comprises a first spacer member interposed between a first end of the conductive cover and the housing and a second spacer member interposed between a second end of the conductive cover and the housing, the first and second spacer members comprising non-conductive material.

10. The rotor system of claim 9, wherein for each of the dampers, the piston is resiliently coupled to the interior of the housing via a first elastomeric member and a second elastomeric member.

11. The rotor system of claim 9, wherein each of the first and second spacer members comprises a hose clamp for attaching an insulating bracket to the housing.

12. The rotor system of claim 10 wherein for each of the dampers, each of the first and second spacer members is respectively positioned on the housing such that the first and second spacer members function to insulate the first and second elastomeric members from heat conducted by the conductive cover.

13. The rotor system of claim 9, wherein each of the dampers comprises a lead lag damper.

14. The rotor system of claim 9, wherein for each of the dampers, the first attachment member is connected to a rotor yoke extension of the rotor hub and the second attachment member is connected to one of the extension arms.

15. A rotorcraft comprising:
a fuselage; and
a rotor system associated with the fuselage, the rotor system comprising:
  a rotor hub comprising a plurality of extension arms for connecting rotor blades to the rotor hub;
  a plurality of dampers connected between a respective one of the extension arms and the rotor hub, wherein each of the dampers comprises:
    a cylindrical housing having a hollow interior;
    a piston disposed within the hollow interior and extending along a central axis of the housing;
    a first attachment member disposed on a first end of the damper and connected to the housing;
    a second attachment member disposed on a second end of the damper and connected to the piston; and
    a conductive cover wrapped around a portion of an exterior surface of the housing between the first attachment member and the second attachment member;
  wherein each of the dampers further comprises a first spacer member interposed between a first end of the conductive cover and the housing and a second spacer member interposed between a second end of the conductive cover and the housing, the first and second spacer members comprising non-conductive material.

16. The rotorcraft of claim 15, wherein for each of the dampers, the piston is resiliently coupled to the interior of the housing via a first elastomeric member and a second elastomeric member.

17. The rotorcraft of claim 16, wherein for each of the dampers, each of the first and second spacer members is respectively positioned on the housing such that the first and second spacer members function to insulate the first and second elastomeric members from heat conducted by the conductive cover.

* * * * *